(12) United States Patent
Kusafuka et al.

(10) Patent No.: US 11,961,429 B2
(45) Date of Patent: Apr. 16, 2024

(54) HEAD-UP DISPLAY, HEAD-UP DISPLAY SYSTEM, AND MOVABLE BODY

(71) Applicant: KYOCERA CORPORATION, Kyoto (JP)

(72) Inventors: Kaoru Kusafuka, Tokyo (JP); Mitsuhiro Murata, Yao (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/779,990

(22) PCT Filed: Nov. 16, 2020

(86) PCT No.: PCT/JP2020/042682
§ 371 (c)(1),
(2) Date: May 25, 2022

(87) PCT Pub. No.: WO2021/106664
PCT Pub. Date: Jun. 3, 2021

(65) Prior Publication Data
US 2023/0005399 A1    Jan. 5, 2023

(30) Foreign Application Priority Data
Nov. 27, 2019    (JP) ................. 2019-214703

(51) Int. Cl.
*G09G 3/00*    (2006.01)
*B60K 35/00*    (2006.01)
(Continued)

(52) U.S. Cl.
CPC ......... *G09G 3/002* (2013.01); *G02B 27/0101* (2013.01); *G02B 27/0179* (2013.01);
(Continued)

(58) Field of Classification Search
CPC ........... G09G 3/002; G09G 2340/0464; G09G 2354/00; G09G 2380/10; G09G 5/38;
(Continued)

(56) References Cited

U.S. PATENT DOCUMENTS 5,510,983 A * 4/1996 Iino .......................... G01P 1/08
701/1
2010/0073773 A1    3/2010 Hotta et al.
(Continued)

FOREIGN PATENT DOCUMENTS

| JP | H6-144082 A | 5/1994 |
| JP | H8-91094 A | 4/1996 |

(Continued)

*Primary Examiner* — Brent D Castiaux
(74) *Attorney, Agent, or Firm* — Procopio, Cory, Hargreaves & Savitch LLP

(57) ABSTRACT

A head-up display includes a display panel, a reflective optical element, a controller, and an obtainer. The display panel displays a first image. The reflective optical element reflects image light from the first image displayed by the display panel. The controller controls a position at which the first image is displayed on the display panel. The obtainer obtains, as positional information, a position of an eye of a user. The controller changes the position at which the first image is displayed on the display panel in accordance with the positional information.

13 Claims, 12 Drawing Sheets

(51) Int. Cl.
  *G02B 27/01* (2006.01)
  *G06F 3/01* (2006.01)
(52) U.S. Cl.
  CPC .............. *G06F 3/013* (2013.01); *B60K 35/00* (2013.01); *B60K 2370/1529* (2019.05); *B60K 2370/167* (2019.05); *B60K 2370/172* (2019.05); *B60K 2370/23* (2019.05); *B60K 2370/52* (2019.05); *G02B 2027/0187* (2013.01); *G09G 2340/0464* (2013.01); *G09G 2354/00* (2013.01); *G09G 2380/10* (2013.01)
(58) Field of Classification Search
  CPC ............ G02B 27/0101; G02B 27/0179; G02B 2027/0187; G02B 2027/0134; G02B 2027/0136; G02B 2027/0138; G02B 2027/0154; G02B 30/31; G02B 30/32; G06F 3/013; B60K 35/00; B60K 2370/1529; B60K 2370/167; B60K 2370/172; B60K 2370/23; B60K 2370/52; B60K 2370/177; B60K 2370/25; B60K 2370/31; B60K 2370/334; B60K 2370/347; B60K 2370/35; H04N 13/31; H04N 13/363
  See application file for complete search history.

(56) References Cited

U.S. PATENT DOCUMENTS

| | | | |
|---|---|---|---|
| 2010/0157430 A1* | 6/2010 | Hotta | G02B 27/01 359/630 |
| 2017/0249923 A1* | 8/2017 | Segawa | G06F 3/1431 |
| 2018/0120572 A1* | 5/2018 | Watanabe | B60K 35/00 |
| 2018/0350236 A1* | 12/2018 | Yamaguchi | G08G 1/0962 |
| 2020/0247240 A1 | 8/2020 | Hirata et al. | |
| 2021/0020145 A1 | 1/2021 | Hirata et al. | |

FOREIGN PATENT DOCUMENTS

| | | |
|---|---|---|
| JP | 2009-8722 A | 1/2009 |
| JP | 2016-170052 A | 9/2016 |
| WO | 2019/082626 A1 | 5/2019 |
| WO | 2019/181319 A1 | 9/2019 |

* cited by examiner

HEAD-UP DISPLAY, HEAD-UP DISPLAY SYSTEM, AND MOVABLE BODY

FIELD

The present disclosure relates to a head-up display, a head-up display system, and a movable body.

BACKGROUND

A known technique is described in, for example, Patent Literature 1.

CITATION LIST

Patent Literature

Patent Literature 1: Japanese Unexamined Patent Application Publication No. 2009-008722

BRIEF SUMMARY

A head-up display according to one embodiment of the present disclosure includes a display panel, a reflective optical element, a controller, and an obtainer. The display panel displays a first image. The reflective optical element reflects image light from the first image displayed by the display panel. The controller controls a position at which the first image is displayed on the display panel. The obtainer obtains, as positional information, a position of an eye of a user. The controller changes the position at which the first image is displayed on the display panel in accordance with the positional information.

A head-up display system according to one embodiment of the present disclosure includes a head-up display and a detector. The detector detects, as positional information, a position of an eye of a user. The head-up display includes a display panel, a reflective optical element, a controller, and an obtainer. The display panel displays a first image. The reflective optical element reflects image light from the first image displayed by the display panel. The controller controls a position at which the first image is displayed on the display panel. The obtainer obtains the positional information from the detector. The controller changes the position at which the first image is displayed on the display panel in accordance with the positional information.

A movable body according to one embodiment of the present disclosure includes a head-up display system. The head-up display system includes a head-up display and a detector. The detector detects, as positional information, a position of an eye of a user. The head-up display includes a display panel, a reflective optical element, a controller, and an obtainer. The display panel displays a first image. The reflective optical element reflects image light from the first image displayed by the display panel. The controller controls a position at which the first image is displayed on the display panel. The obtainer obtains the positional information from the detector. The controller changes the position at which the first image is displayed on the display panel in accordance with the positional information.

BRIEF DESCRIPTION OF DRAWINGS

The objects, features, and advantages of the present disclosure will become more apparent from the following detailed description and the drawings.

DETAILED DESCRIPTION

As a head-up display (HUD) with the structure that forms the basis of a HUD according to one or more embodiments of the present disclosure, a known HUD causes images having parallax between them to reach the left and right eyes of a user and projects a virtual image in the field of view of the user to be viewed as a three-dimensional (3D) image with depth.

With a HUD mounted on a movable body such as a vehicle, the user's eye positions may change depending on the sitting posture or the sifting height, thus causing an image to be less easily viewable to the user. A HUD that can provide an image easily viewable to the user as appropriate at the user's eye positions is awaited.

One or more embodiments of the present disclosure will now be described with reference to the drawings. The drawings used herein are schematic and are not drawn to scale relative to the actual size of each component.

Head-Up Display System

Figure 1:
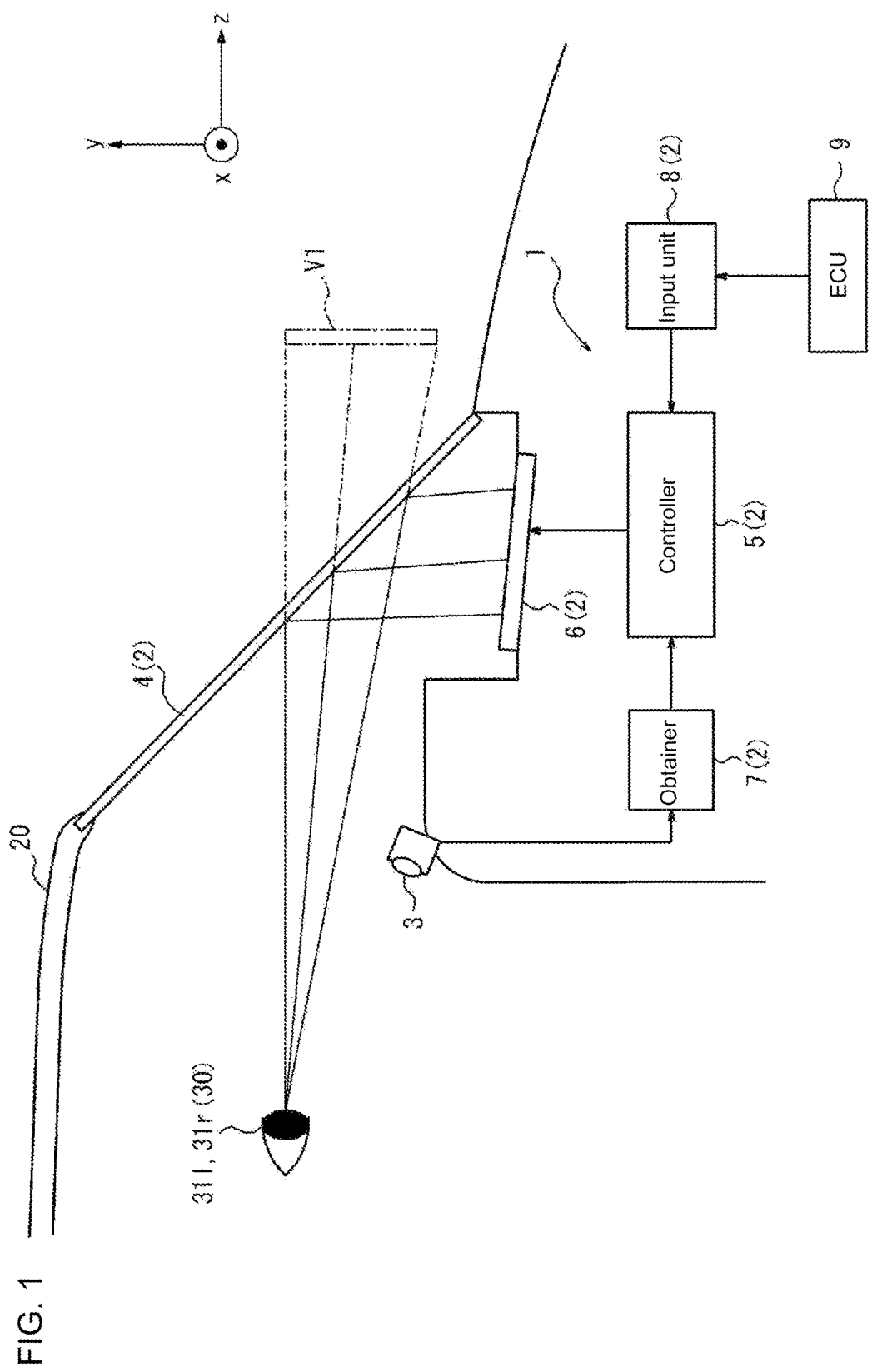
FIG. 1 is a schematic diagram of an example head-up display (HUD) system mounted on a movable body.

As shown in FIG. 1, a head-up display system 1 according to an embodiment of the present disclosure includes a head-up display 2 and a detector 3. The head-up display system 1 is hereafter also referred to as a HUD system 1. The HUD system 1 may be mounted on a movable body 20. The HUD system 1 mounted on the movable body 20 displays an image for a user 30 aboard the movable body 20.

FIG. 1 shows the HUD system 1 mounted on the movable body 20. In FIG. 1, x-direction refers to an interocular direction of the user 30, or the direction along a line passing through a left eye 31*l* and a right eye 31*r* of the user 30, z-direction refers to the front-rear direction as viewed from the user 30, and y-direction refers to the height direction orthogonal to x-direction and z-direction.

The movable body according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above. For example, the automobile may include an industrial vehicle traveling on a road, and one type of vehicle may fall within a plurality of classes. The vessel according to one or more embodiments of the present disclosure includes a jet ski, a boat, or a tanker. The aircraft according to one or more embodiments of the present disclosure includes a fixed-wing aircraft or a rotary-wing aircraft.

Structure of Detector

The detector 3 detects the positions of the left eye 31*l* and the right eye 31*r* of the user 30. The detector 3 outputs the detected positions of the left eye 31*l* and the right eye 31*r* of the user 30 to an obtainer 7. The detector 3 may include an imaging device or a sensor. For the HUD system 1 mounted on the movable body 20 being a vehicle, the detector 3 may be installed in any of various places such as on a rearview mirror, an instrument panel, a steering wheel, or a dashboard.

When the detector 3 includes an imaging device, the imaging device captures an image of a subject. The imaging device includes an image sensor. The image sensor may include, for example, a charge-coupled device (CCD) image sensor or a complementary metal-oxide-semiconductor (CMOS) image sensor. The imaging device is arranged to have the face of the user 30 being at the position of the subject. For example, the detector 3 may define a predetermined position as the origin and detect the direction and the amount of displacements of the positions of the left eye 31*l* and the right eye 31*r* from the origin. The detector 3 may detect, with two or more imaging devices, the position of at least one of the left eye 31*l* or the right eye 31*r* as the coordinates in a 3D space.

The detector 3 may include no imaging device and may be connected to an external imaging device. The detector 3 may include an input terminal for receiving signals from the external imaging device. The external imaging device may be directly connected to the input terminal. The external imaging device may be connected to the input terminal indirectly through a shared network.

For the detector 3 including a sensor, the sensor may be an ultrasonic sensor or an optical sensor.

Structure of Head-Up Display

The HUD 2 includes a reflective optical element 4, a controller 5, a display panel 6, and the obtainer 7.

The display panel 6 displays an image in response to an instruction from the controller 5. The display panel 6 may include a flat display panel selected from a liquid crystal display (LCD), an organic electroluminescent (EL) display, an inorganic EL display, a plasma display panel (PDP), a field-emission display (FED), an electrophoresis display, and a twisting-ball display. The display panel 6 being a transmissive LCD may have a backlight on the back.

The reflective optical element 4 reflects at least a part of image light from the first image displayed on the display panel 6. The reflective optical element 4 reflects image light from the first image emitted from the display panel 6 toward the left eye 31*l* and the right eye 31*r* of the user 30. The HUD system 1 mounted on the movable body 20 being a vehicle may use a windshield of the vehicle as the reflective optical element 4.

In one of multiple embodiments, the display panel 6 emits image light directly toward the reflective optical element 4 as shown in FIG. 1. The image light reflected by the reflective optical element 4 reaches the left eye 31*l* and the right eye 31*r* of the user 30. This causes the user 30 to view a first virtual image V1 of the display panel 6 reflected by the reflective optical element 4.

The controller 5 may be connected to each of the components of the HUD 2 to control these components. The controller 5 may be, for example, a processor. The controller 5 may include one or more processors. The processors may include a general-purpose processor that reads a specific program to perform a specific function, and a processor dedicated to specific processing. The dedicated processor may include an application-specific integrated circuit (ASIC). The processor may include a programmable logic device (PLD). The PLD may include a field-programmable gate array (FPGA). The controller 5 may be either a system on a chip (SoC) or a system in a package (SiP) in which one or more processors cooperate with other components.

The controller 5 includes a memory. The memory includes any storage device such as a random-access memory (RAM) or a read-only memory (ROM). The memory may store any programs and information for various processes. For example, the memory may store, as a first image, a display item to be displayed. Examples of the display item include text, graphics, and animations combining text and graphics.

The controller 5 controls the details and the position of the image on the display panel 6. The controller 5 obtains information about the positions of the left eye 31*l* and the right eye 31*r* of the user 30 from the detector 3 through the obtainer 7. The controller 5 can change the position at which the first image is displayed on the display panel 6 in accordance with positional information obtained from the obtainer 7.

The obtainer 7 can obtain positional information about the left eye 31*l* and the right eye 31*r* of the user 30 detected by the detector 3. The detector 3 and the obtainer 7 are connected to each other through wired or wireless communication or both. For the movable body 20 being a vehicle, the detector 3 and the obtainer 7 may be connected to a vehicle network such as a controller area network (CAN). The obtainer 7 may include a connector for wired communication, such as an electrical connector or an optical connector. The obtainer 7 may include an antenna for wireless communication.

The HUD 2 may further include an input unit 8 that obtains external information. For the HUD system 1 mounted on the movable body 20, the input unit 8 can obtain information from an electronic control unit (ECU) 9 in the movable body 20. The ECU 9 is a computer that electronically controls various devices mounted on the movable body 20. The ECU 9 may include a navigation system or a system for controlling the inter-vehicle distance. The input unit 8 can receive a vehicle speed signal representing the vehicle speed from the ECU 9 to receive an input of the speed of the movable body 20.

Figure 2:
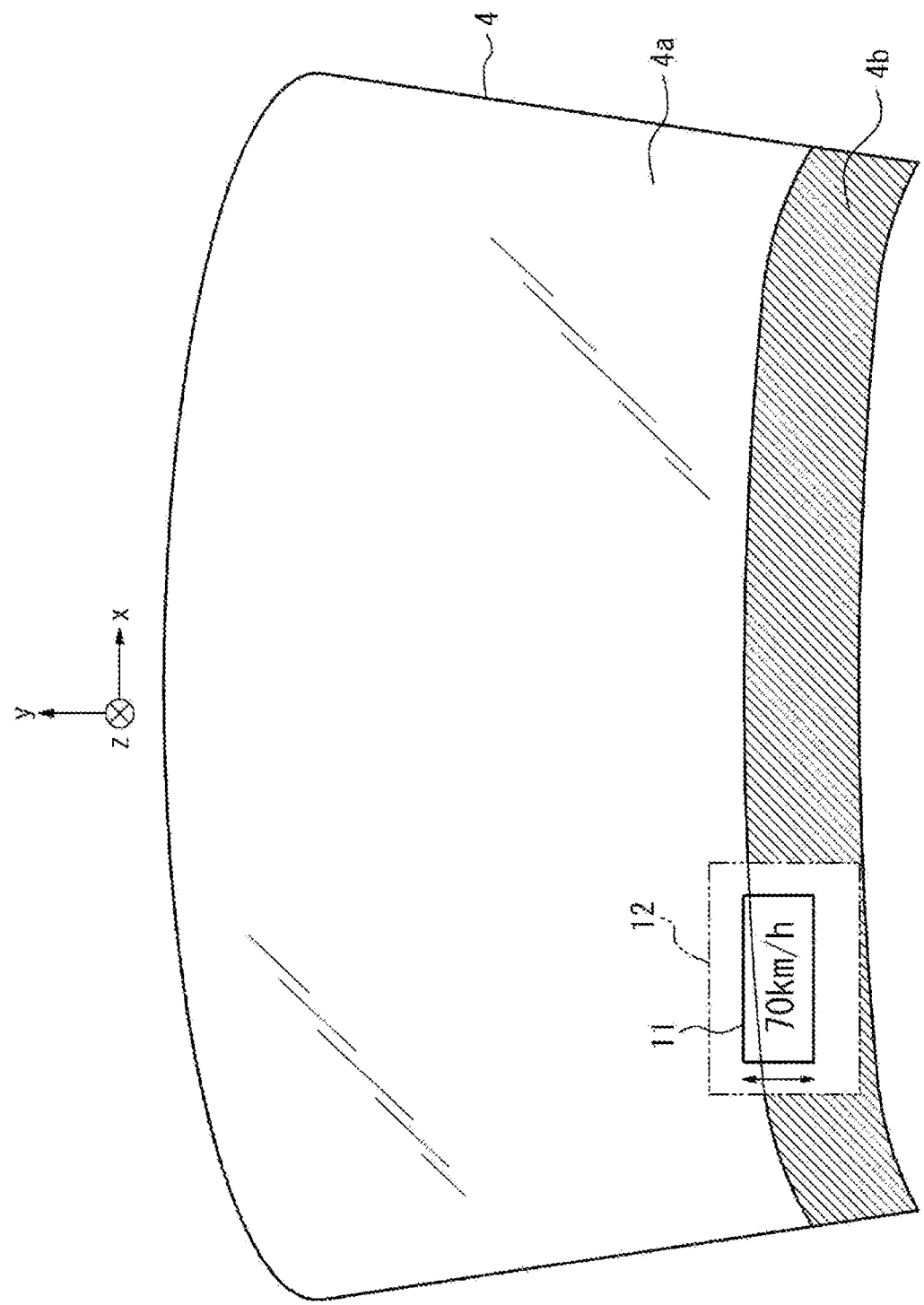
FIG. 2 is a diagram of an example display performed by the HUD system in FIG. 1.

The HUD 2 can cause a first image 11 to appear in the field of view of the user 30 as shown in FIG. 2. The first image 11 appears in an image display area 12. The image display area 12 is an area on the reflective optical element 4 onto which an image displayed on the display panel 6 can be projected. The controller 5 can change the position at which the first image is displayed on the display panel 6 in accordance with positional information about the left eye 31*l* and the right eye 31*r*. Changing the position of the first image on the display panel 6 changes the display position of the first image 11 within the image display area 12.

Displaying with Head-Up Display

As shown in FIG. 2, the reflective optical element 4 may include a first reflective area 4*a* that reflects a part of image light being incident and transmits another part of the image light. The display panel 6 may project at least a part of the first image 11 onto the first reflective area 4*a*. This allows the part of the first image 11 in the first reflective area 4*a* to appear in the field of view of the user 30 in a manner superimposed on the background opposite to the user 30 from the reflective optical element 4.

The reflective optical element 4 may include a second reflective area 4*b* that reflects a part of image light being incident and substantially blocks another part of the image light. This allows the first image 11 projected onto the second reflective area 4*b* to appear clearly in the field of view of the user 30 without being superimposed on the background opposite to the user 30 from the reflective optical element 4. For example, the display panel 6 may project a part of the first image 11 onto the second reflective area 4*b*. This allows the first image 11 to show information independent of information about the background.

In the HUD system 1 mounted on the movable body 20 being a vehicle, the windshield may include a lower black portion as the second reflective area 4*b*. The lower black portion of the windshield may be referred to as a black ceramic portion. The second reflective area 4*b* in the movable body 20 may be usable for displaying information from measuring instruments such as a speedometer, a tachometer, or a direction indicator, which may be located on an instrument panel in a known movable body.

Figure 3:
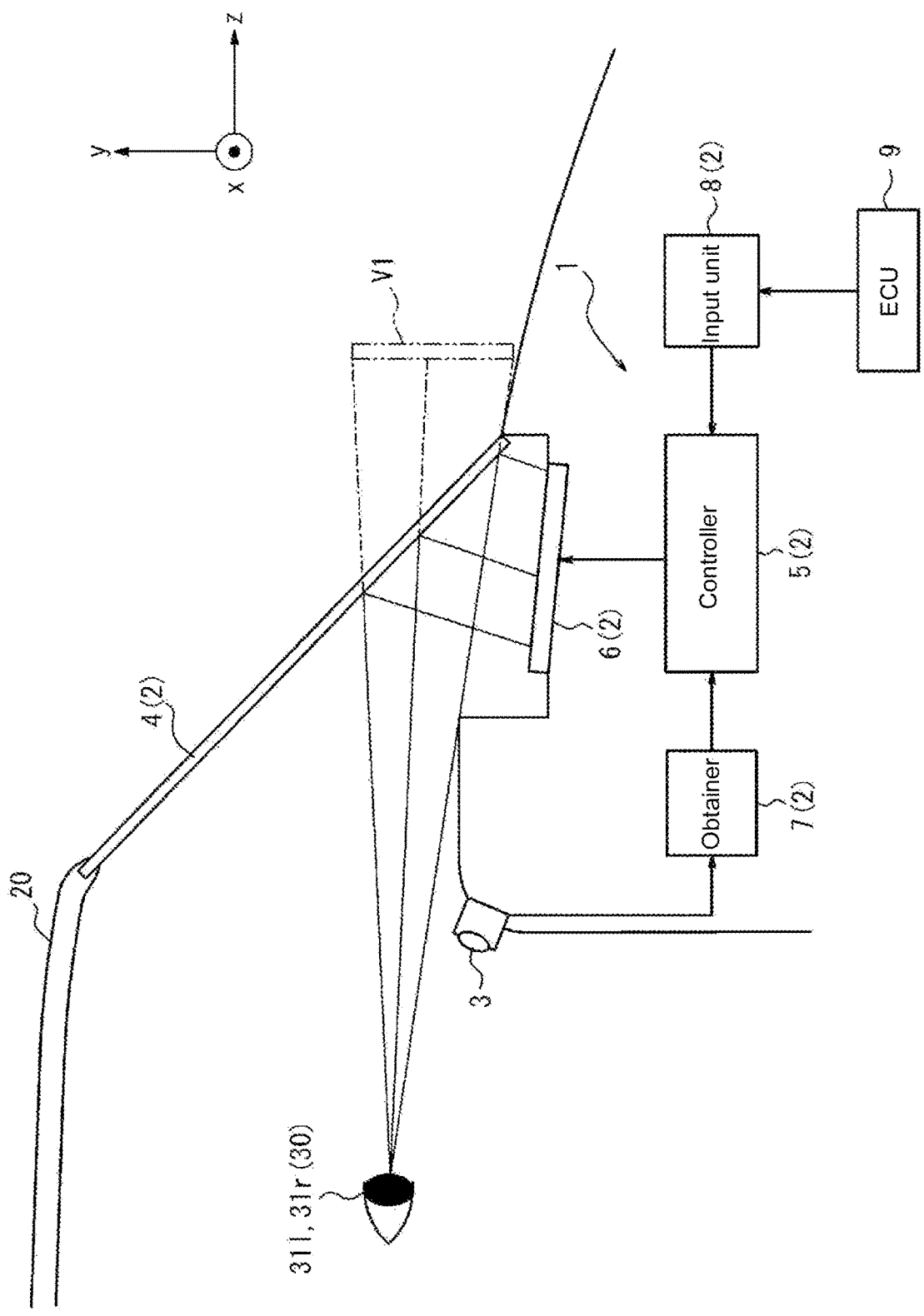
FIG. 3 is a diagram describing an image display performed when a user's eye position is lower than in FIG. 1.

The first image 11 is viewed by the user 30 differently as the positions of the left eye 31*l* and the right eye 31*r* of the user 30 change in y-direction. The controller 5 controls the display panel 6 to display the first image 11 at a position in the display area in a manner easily viewable to the user 30. As shown in FIG. 3, for example, the left eye 31*l* and the right eye 31*r* of the user 30 are at positions lower than in the example shown in FIG. 1 due to the sitting height or the posture of the user 30. In this case, some optical paths of image light may interfere with components inside the movable body 20. A part of the image display area 12 located below the reflective optical element 4 is not viewable to the user 30. The controller 5 thus causes the position at which the first image 11 is displayed on the display panel 6 to be in a range in which the first image 11 is viewable to the user 30. The controller 5 may set the lower limit of the position at which the first image 11 is displayed in the image display area 12 in the viewable range for the user 30 on the reflective optical element 4. The controller 5 may control the display position of the first image on the display panel 6 to cause the first image 11 to appear at a position above the lower limit in the image display area 12.

When the positions of the left eye 31*l* and the right eye 31*r* of the user 30 change, the positional relationship changes between the position on the display panel 6 and the position on the reflective optical element 4 viewable to the user 30. For example, an image displayed in the second reflective area 4*b* to be viewable to the user 30 with the left eye 31*l* and the right eye 31*r* at high positions may not be displayable in the second reflective area 4*b* when the left eye 31*l* and the right eye 31*r* of the user 30 are at low positions. The controller 5 may thus change the position at which the first image 11 is displayed on the display panel 6 in accordance with positional information about the left eye 31*l* and the right eye 31*r* of the user 30. The controller 5 may display a specific first image 11 in the second reflective area 4*b* to allow the image to appear clearly. The controller 5 displays another specific first image 11 in the first reflective area 4*a* to cause the first image 11 to be superimposed on the intended background.

As described above, the HUD system 1 according to one or more embodiments of the present disclosure can provide an image that is easily viewable to the user 30 independently of the user's eye positions.

Display Position in Accordance with Speed

As described above, the HUD 2 can receive, from the input unit 8, an input of the speed at which the movable body 20 moves. The controller 5 may thus change the position at which the first image 11 is displayed on the display panel 6 in accordance with the speed of the movable body 20 in addition to the positional information about the left eye 31*l* and the right eye 31*r* of the user 30. For example, the controller 5 may change the position at which the first image 11 is displayed on the display panel 6 to cause the first image 11 to be viewable in the field of view of the user 30 at a higher position as the speed of the movable body 20 is higher. For example, the controller 5 may change the position at which the first image 11 is displayed on the display panel 6 to cause the first image 11 to be viewable in the field of view of the user 30 at a lower position as the speed of the movable body 20 is lower.

The user 30 is more likely to direct the gaze farther as the speed of the movable body 20 is higher. The gaze direction of the user 30 thus shifts upward. The user 30 can view the first image 11 that is viewable at a higher position without moving the gaze greatly. The user 30 is more likely to direct the gaze toward an object located closer, such as a road surface, as the speed of the movable body 20 is lower. The gaze direction of the user 30 thus shifts downward. The user 30 can view the first image 11 that is viewable at a lower position without moving the gaze greatly.

The controller 5 displays, for example, an image of a speedometer as the first image 11. As the speed is higher, the first image 11 is displayed at a higher position. As the speed is lower, the first image 11 is displayed at a lower position. The user 30 can visually obtain rough information about the speed without viewing the first image 11 in detail.

Head-Up Display System with Multiple Image Display

Figure 4:
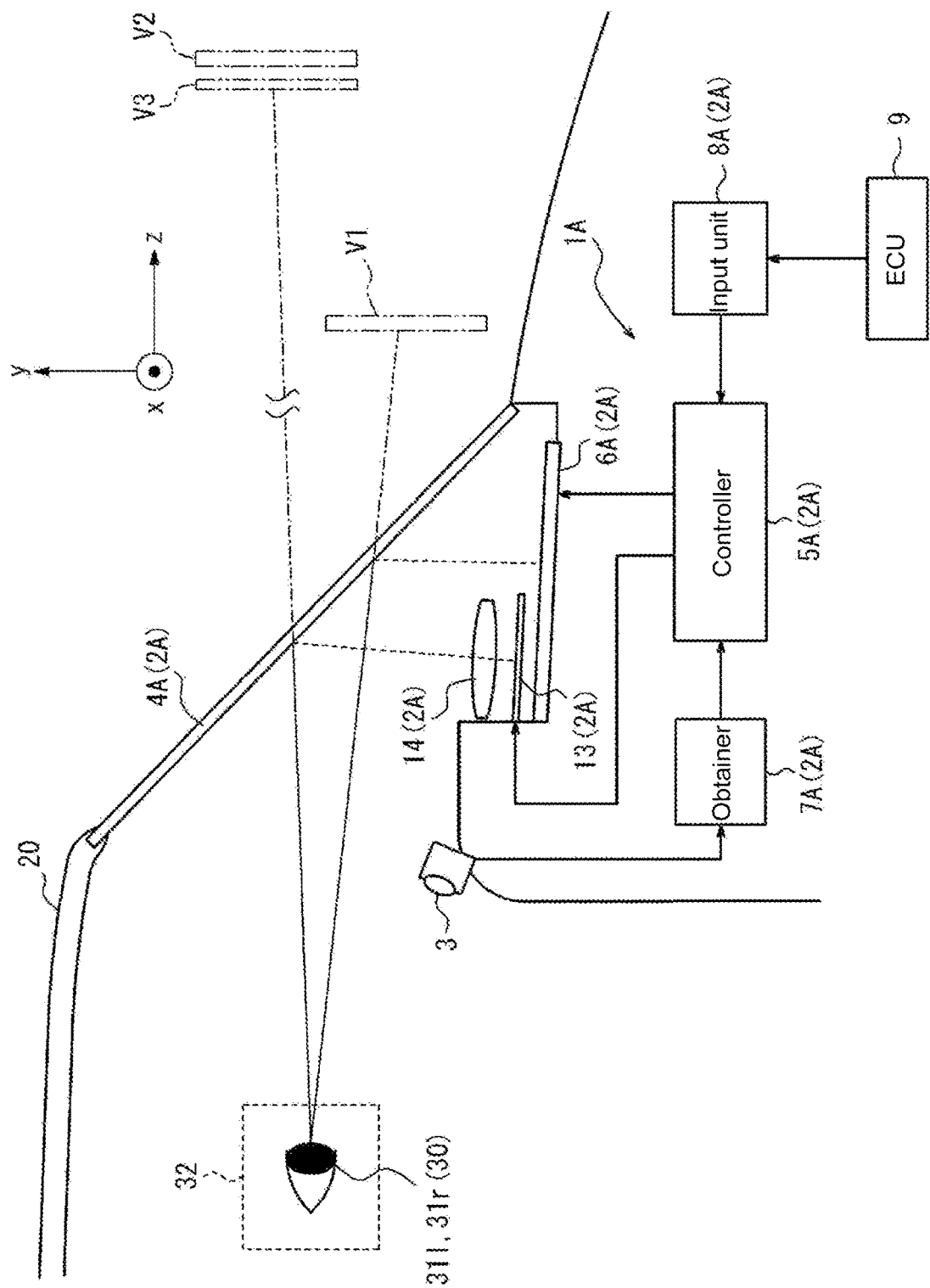
FIG. 4 is a schematic diagram of another example HUD system mounted on a movable body.

FIG. 4 shows a HUD system 1A according to one or more embodiments of the present disclosure that can display multiple images. The HUD system 1A includes a HUD 2A and a detector 3. The HUD 2A in the HUD system 1A includes a reflective optical element 4A, a controller 5A, a display panel 6A, an obtainer 7A, an input unit 8A, a parallax optical element 13, and an optical system 14. The reflective optical element 4A, the controller 5A, the display panel 6A, the obtainer 7A, and the input unit 8A are similar to the reflective optical element 4, the controller 5, the display panel 6, the obtainer 7, and the input unit 8 in FIG. 1. The differences between the corresponding components will now be described.

Figure 5:
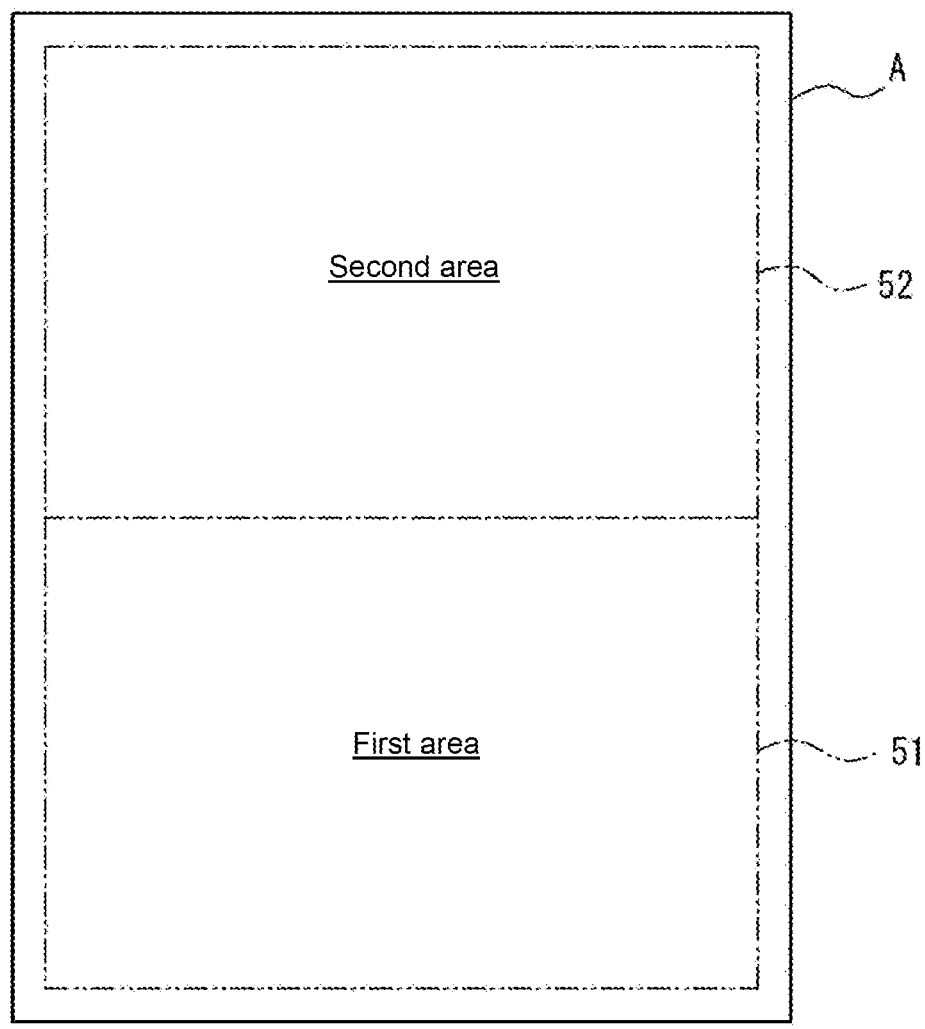
FIG. 5 is a diagram of areas on a display panel shown in FIG. 4.

As shown in FIG. 5, the display panel 6A includes a planar active area A including a first area 51 and a second area 52. The first area 51 is located near a lower end of the reflective optical element 4A. The first area 51 is an area in which a two-dimensional (2D) image can be displayed. The second area 52 is an area in which a parallax image viewable to the user 30 as a 3D image can be displayed. The parallax image includes a left eye image and a right eye image (described later). The right eye image has parallax with respect to the left eye image. The HUD 2A projects a second image displayed in the first area 51 and a third image displayed in the second area 52 onto the reflective optical element 4A to allow these images to appear in the field of view of the user 30. The second image and the third image are included in the first image.

The HUD 2A can cause the second image to appear in the field of view of the user 30 in the same manner as the HUD 2 shown in FIG. 1. The third image displayed by the HUD 2A will be described below.

Figure 6:
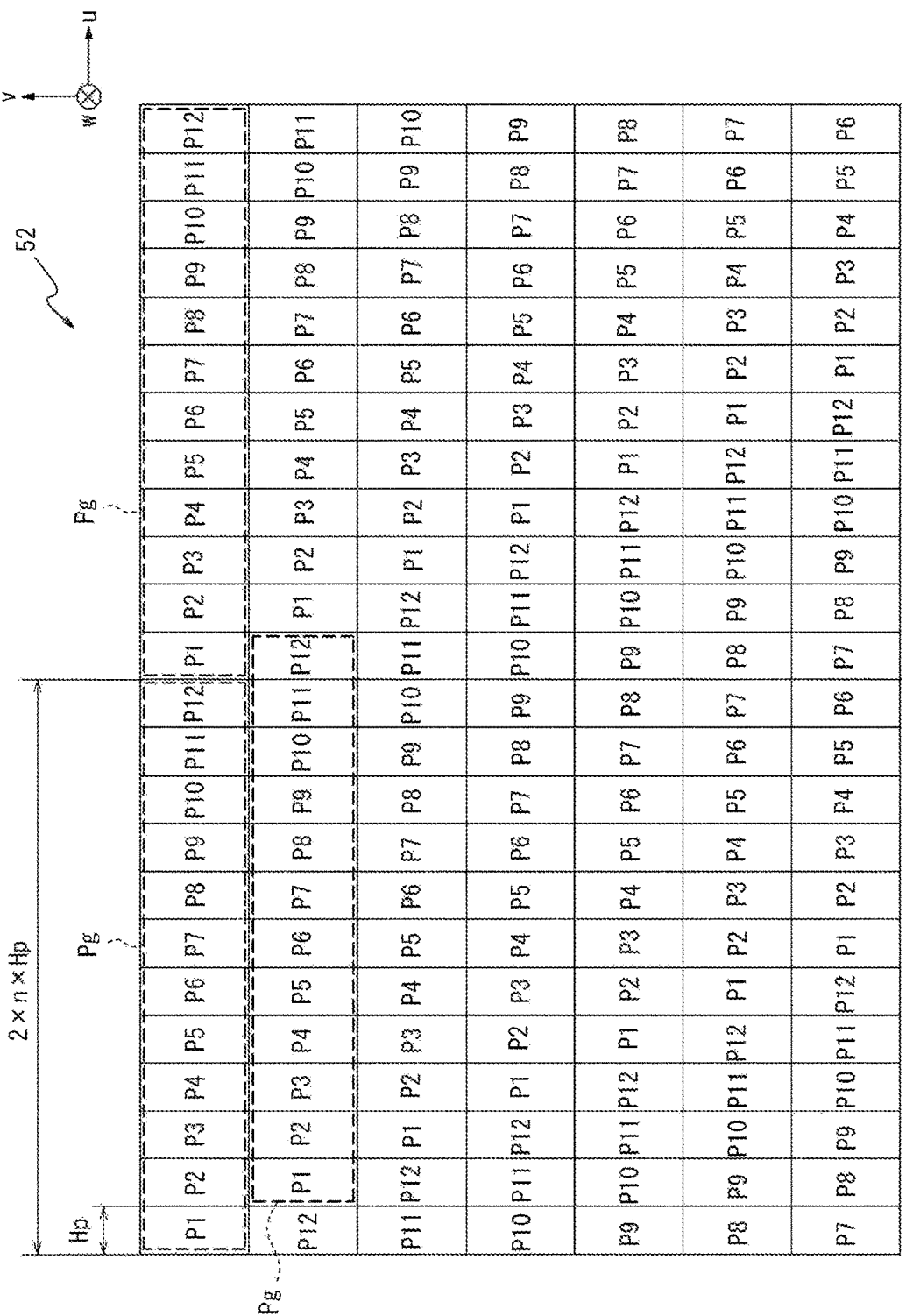
FIG. 6 is a diagram of the display panel shown in FIG. 4 viewed in the depth direction.

As shown in FIG. 6, the display panel 6A includes the planar active area A including multiple divisional areas. FIG. 6 shows the second area 52 in the active area A. In FIG. 6, the divisional areas are defined in u-direction and in v-direction orthogonal to u-direction. The direction orthogonal to u-direction and v-direction is referred to as w-direction. The u-direction may be referred to as a horizontal direction. The v-direction may be referred to as a vertical direction. The w-direction may be referred to as a depth direction. The u-direction is the direction corresponding to the parallax direction of the user 30.

Each divisional area corresponds to a subpixel. Thus, the active area A includes multiple subpixels arranged in a lattice in u-direction and v-direction. Each subpixel has one of the colors red (R), green (G), and blue (B). One pixel may be a set of three subpixels with R, G, and B. One pixel may include four or any other number of subpixels, instead of three subpixels. One pixel may include subpixels with a combination of colors different from R, G, and B. A pixel may be referred to as a picture element. For example, multiple subpixels included in one pixel may be arranged in the horizontal direction. Multiple subpixels having the same color may be arranged, for example, in the vertical direction.

The multiple subpixels arranged in the second area 52 in the active area A form multiple subpixel groups Pg under control by the controller 5. The multiple subpixel groups Pg are arranged repeatedly in u-direction. Each subpixel group Pg may be aligned with or shifted from the corresponding subpixel group Pg in v-direction. For example, the subpixel groups Pg are repeatedly arranged in v-direction at positions shifted by one subpixel in u-direction from the corresponding subpixel group Pg in adjacent rows. The subpixel groups Pg each include multiple subpixels in predetermined rows and columns. More specifically, the multiple subpixel groups Pg each include (2×n×b) subpixels P1 to PN (N=2× n×b), which are consecutively arranged in b rows in v-direction and in (2×n) columns in u-direction. In the example shown in FIG. 6, n is 6, and b is 1. The second area 52 shown in FIG. 6 includes the subpixel groups Pg each including 12 subpixels P1 to P12 consecutively arranged in one row in v-direction and in 12 columns in u-direction. In the example shown in FIG. 3, some of the subpixel groups Pg are denoted by reference signs.

Each subpixel group Pg is the smallest unit controllable by the controller 5 to display an image. The subpixels included in each subpixel group Pg are identified using identification reference signs P1 to PN (N=2×n×b). The subpixels P1 to PN (N=2×n×b) included in each subpixel group Pg with the same identification reference signs are controlled by the controller 5 at the same time. Being controlled at the same time includes being controlled simultaneously and substantially simultaneously. Being controlled at the same time includes being controlled based on the same single clock and in the same frame. For example, the controller 5 can switch the image to be displayed by the subpixels P1 from the left eye image to the right eye image at the same time in all the subpixel groups Pg.

As shown in FIG. 4, the parallax optical element 13 extends along the display panel 6A. The parallax optical element 13 is separate from the second area 52 in the display panel 6A by a gap g, or a distance. The parallax optical element 13 may be located opposite to the reflective optical element 4A from the display panel 6A.

Figure 7:
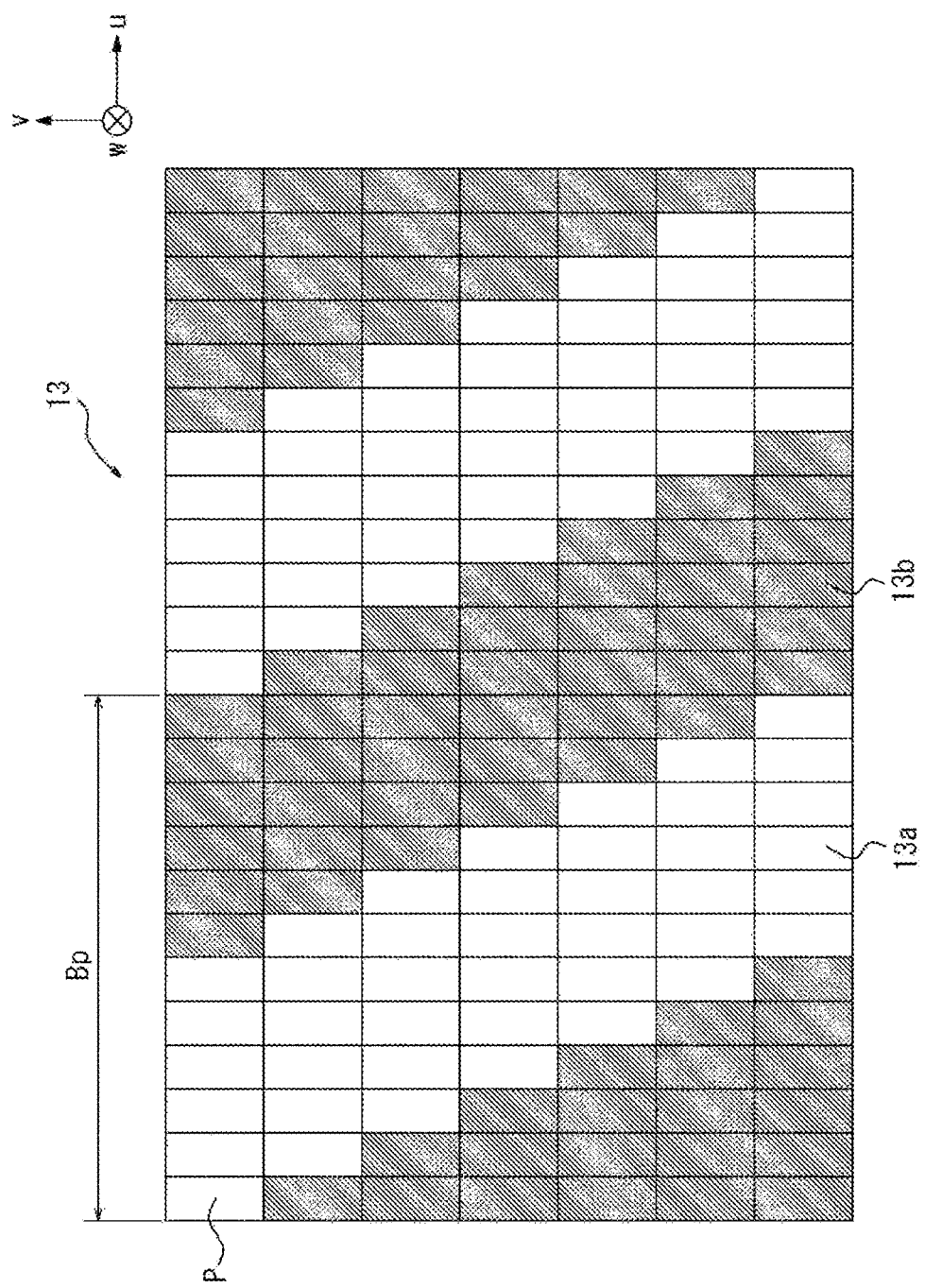
FIG. 7 is a diagram of an example parallax optical element shown in FIG. 4 viewed in the depth direction.

The parallax optical element 13 can define the traveling direction of image light emitted from the multiple subpixels. The parallax optical element 13 can substantially define a viewing zone 32 for a parallax image. The viewing zone 32 is the range of space from which the left eye 31$l$ and the right eye 31$r$ of the user 30 can view the parallax image as a 3D image. In one example, the parallax optical element 13 is a liquid crystal shutter as shown in FIG. 7. The liquid crystal shutter includes multiple pixels P, similarly to the display panel 6. The parallax optical element 13 being a liquid crystal shutter can control the light transmittance of each pixel P. Each pixel P in the parallax optical element 13 can switch between a high light-transmittance state and a low light-transmittance state. A pixel P with a higher light transmittance may be hereafter referred to as an open pixel. The multiple pixels P included in the parallax optical element 13 may correspond to the multiple subpixels included in the display panel 6. The multiple pixels P in the parallax optical element 13 differ from the subpixels in the display panel 6 in that the pixels P have no color components.

The parallax optical element 13 includes multiple transmissive portions 13$a$ and multiple light-reducing portions 13$b$ as controlled by the controller 5. For the parallax optical element 13 being a liquid crystal shutter, the transmissive portions 13$a$ include pixels P with a higher light transmittance. The light-reducing portions 13$b$ include pixels P with a lower light transmittance. The light-reducing portions 13$b$ are strip areas extending in a predetermined direction in the plane of the parallax optical element 13. The light-reducing portions 13$b$ define transmissive portions 13$a$ between adjacent light-reducing portions 13$b$. The transmissive portions 13$a$ and the light-reducing portions 13$b$ extend in a predetermined direction along the active area A. The transmissive portions 13$a$ and the light-reducing portions 13$b$ are arranged alternately in a direction orthogonal to the predetermined direction. The transmissive portions 13$a$ have a higher light transmittance than the light-reducing portions 13$b$. The transmissive portions 13$a$ may have a light transmittance 10 or more times, or 100 or more times, or 1000 or more times the light transmittance of the light-reducing portions 13$b$. The light-reducing portions 13$b$ have a lower light transmittance than the transmissive portions 13$a$. The light-reducing portions 13$b$ may block image light.

The direction in which the transmissive portions 13$a$ and the light-reducing portions 13$b$ extend may correspond to the direction in which the subpixel groups Pg in the display panel 6A are arranged. The parallax optical element 13 is controlled to simultaneously cause subpixels in the subpixel groups Pg identified with the same identification reference signs P1 to P12 to be light-transmissive or light-reducing as viewed with the left eye 31$l$ and the right eye 31$r$ of the user 30.

The optical system 14 causes image light from the third image emitted from the second area 52 on the display panel 6A to travel toward the reflective optical element 4A. The optical system 14 may have a positive refractive index. The optical system 14 with a predetermined positive refractive index causes the third image on the second area 52 to be projected as an enlarged virtual image at a position farther than the reflective optical element 4A in the field of view of the user 30. The optical system 14 may include a convex lens, a concave mirror, or both.

Figure 8:
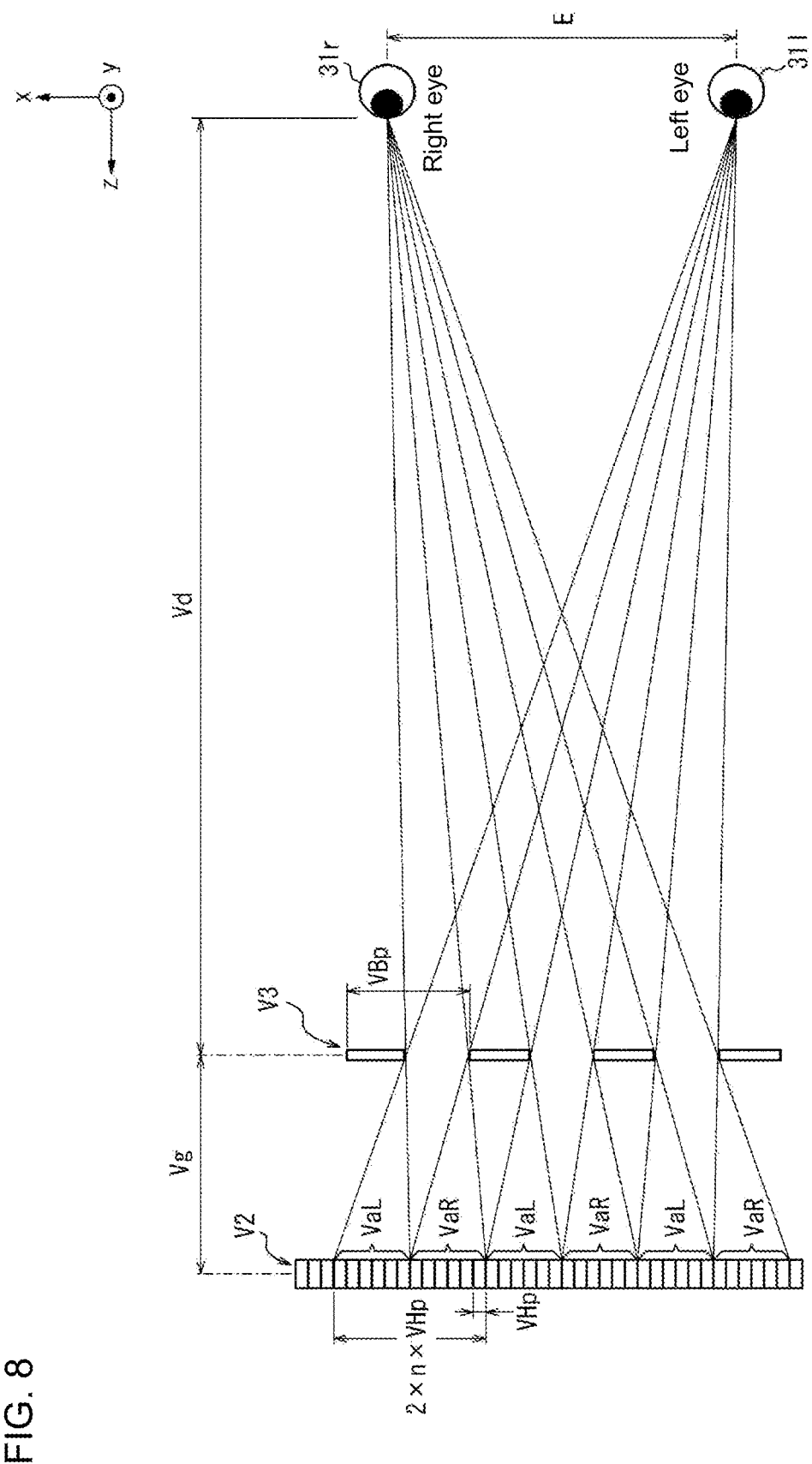
FIG. 8 is a diagram describing the relationship between a virtual image and the user's eyes shown in FIG. 4.

Image light from the third image emitted from the second area 52 on the display panel 6A partially transmits through the transmissive portions 13a and reaches the reflective optical element 4A through the optical system 14. The image light reaching the reflective optical element 4A is reflected by the reflective optical element 4A and reaches the left eye 31l and the right eye 31r of the user 30. This allows the left eye 31l and the right eye 31r of the user 30 to view a second virtual image V2 in the second area 52 frontward from the reflective optical element 4A. As shown in FIG. 8, the user 30 perceives an image including a third virtual image V3 that is a virtual image of the parallax optical element 13 appearing to define the direction of image light from the second virtual image V2.

The user 30 thus views the third image appearing as the second virtual image V2 through the third virtual image V3. In reality, the user 30 does not view the third virtual image V3, or the virtual image of the parallax optical element 13. However, the third virtual image V3 is hereafter referred to as appearing at the position at which the virtual image of the parallax optical element 13 is formed and as defining the traveling direction of image light from the second virtual image V2. Areas in the second virtual image V2 viewable to the user 30 with image light reaching the position of the left eye 31l of the user 30 are hereafter referred to as left viewable areas VaL. Areas in the second virtual image V2 viewable to the user 30 with image light reaching the position of the right eye 31r of the user 30 are referred to as right viewable areas VaR.

As shown in FIG. 8, a virtual image barrier pitch VBp and a virtual image gap Vg are determined to satisfy Formula 1 and Formula 2 below using an optimum viewing distance Vd.

$$E:Vd=(n \times VHp):Vg \quad (1)$$

$$Vd:VBp=(Vdv+Vg):(2 \times n \times VHp) \quad (2)$$

The virtual image barrier pitch VBp is the interval in x-direction at which the light-reducing portions 12b projected as the third virtual image V3 are arranged in a direction corresponding to u-direction. The virtual image gap Vg is the distance between the third virtual image V3 and the second virtual image V2. The optimum viewing distance Vd is the distance between the position of the left eye 31l or the right eye 31r of the user 30 and the third virtual image V3, or the virtual image of the parallax optical element 13. An interocular distance E is the distance between the left eye 31l and the right eye 31r. The interocular distance E may be, for example, 61.1 to 64.4 mm, as calculated through studies conducted by the National Institute of Advanced Industrial Science and Technology. VHp is the horizontal length of each subpixel of the virtual image. VHp is the length of each subpixel of the second virtual image V2 in a direction corresponding to x-direction.

As described above, the left viewable areas VaL in FIG. 8 are defined on the second virtual image V2 and viewable with the left eye 31l of the user 30 when image light transmitted through the transmissive portions 13a of the parallax optical element 13 reaches the left eye 31l of the user 30. As described above, the right viewable areas VaR are defined on the second virtual image V2 and viewable with the right eye 31r of the user 30 when image light transmitted through the transmissive portions 13a of the parallax optical element 13 reaches the right eye 31r of the user 30.

Figure 9:
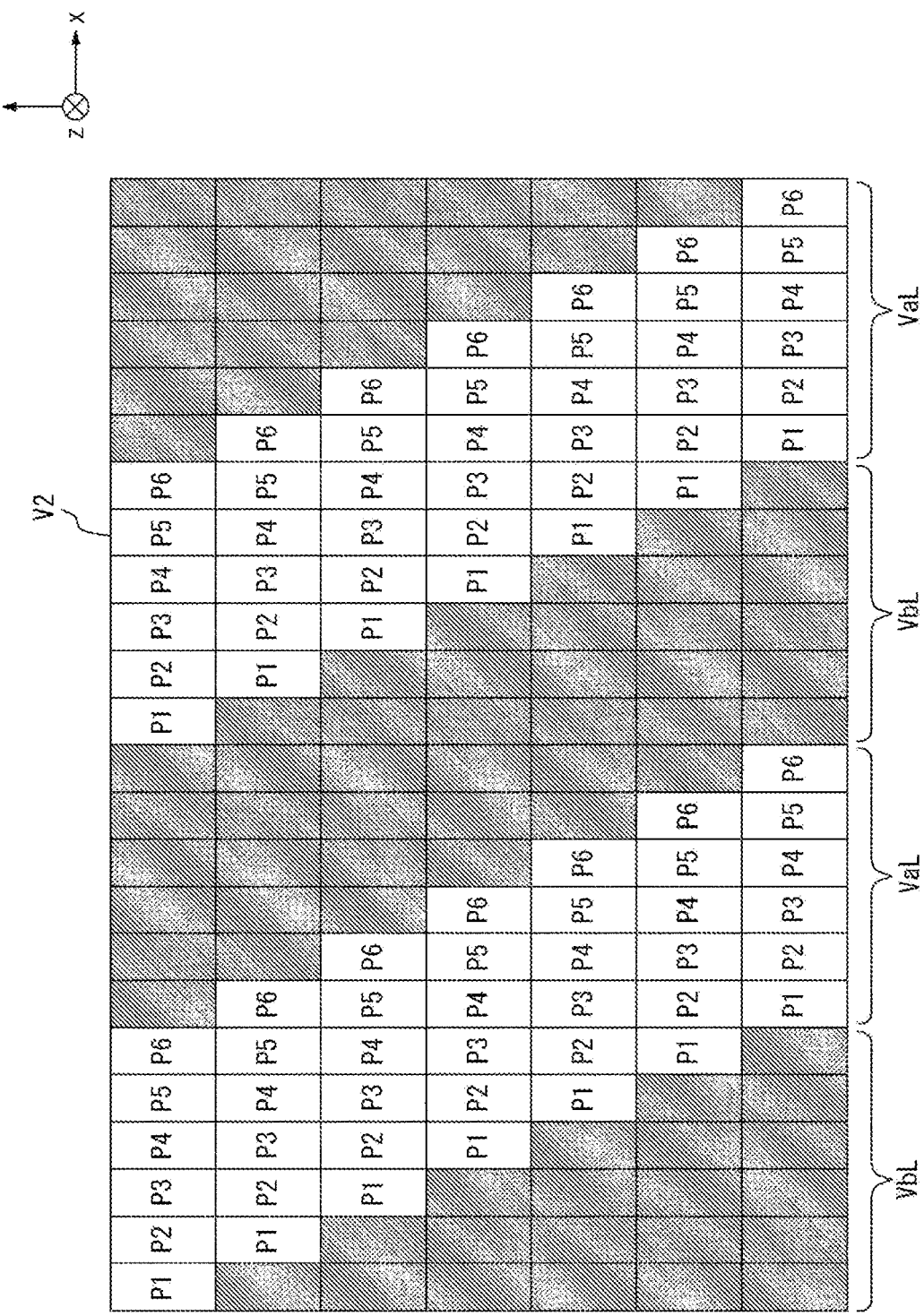
FIG. 9 is a diagram showing an area viewable with a left eye in the virtual image for the display panel.

FIG. 9 shows an example array of subpixels of the second virtual image V2 as viewed with the left eye 31l of the user 30 using the parallax optical element 13 with an aperture ratio of 50%. The subpixels on the second virtual image V2 are denoted by the same identification reference signs P1 to P12 as the subpixels shown in FIG. 6. The parallax optical element 13 with an aperture ratio of 50% includes the transmissive portions 13a and the light-reducing portions 13b each having the same width in the interocular direction (x-direction). The second virtual image V2 includes left light-reducing areas VbL with light reduced by the third virtual image V3. The left light-reducing areas VbL are less easily viewable with the left eye 31l of the user 30 when the image light is reduced by the light-reducing portions 13b on the parallax optical element 13.

Figure 10:
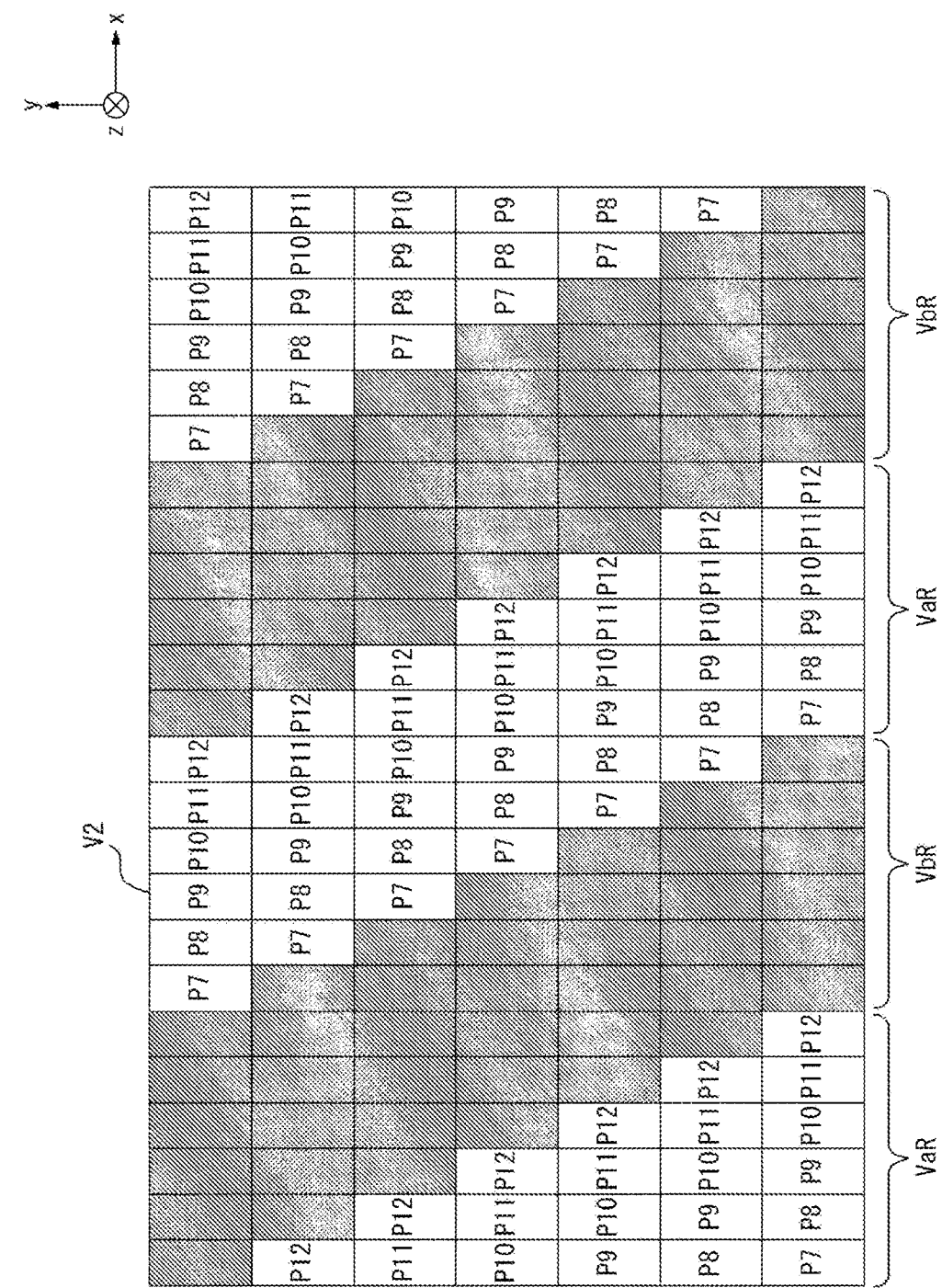
FIG. 10 is a diagram showing an area viewable with a right eye in the virtual image for the display panel.

FIG. 10 shows an example array of subpixels of the second virtual image V2 viewed with the right eye 31r of the user 30 when the left viewable areas VaL and the left light-reducing areas VbL located as shown in FIG. 9 are viewed with the right eye 31r of the user 30. The second virtual image V2 includes right light-reducing areas VbR with light reduced by the third virtual image V3. The right light-reducing areas VbR are less easily viewable with the right eye 31r of the user 30 when the image light is reduced by the light-reducing portions 13b on the parallax optical element 13.

With the parallax optical element 13 having an aperture ratio of 50%, the multiple left viewable areas VaL can match the multiple right light-reducing areas VbR. The multiple right viewable areas VaR can match the multiple left light-reducing areas VbL. With the parallax optical element 13 having an aperture ratio of 50%, the multiple left viewable areas VaL can include the multiple right light-reducing areas VbR. The multiple right viewable areas VaR can include the multiple left light-reducing areas VbL. Thus, the multiple right viewable areas VaR are not easily viewable with the left eye 31l. The multiple left viewable areas VaL are not easily viewable with the right eye 31r.

In the example shown in FIGS. 9 and 10, each left viewable area VaL includes the virtual image of each of the subpixels P1 to P6 arranged in the second area 52. The virtual image of the subpixels P7 to P12 arranged in the second area 52 are less easily viewable with the left eye 31l of the user 30. Each right viewable area VaR includes the virtual image of each of the subpixels P7 to P12 arranged in the second area 52. The virtual image of the subpixels P1 to P6 arranged in the second area 52 are less easily viewable with the right eye 31r of the user 30. The controller 5 can cause the subpixels P1 to P6 to display the left eye image. The controller 5 can cause the subpixels P7 to P12 to display the right eye image. This allows the left eye 31l of the user 30 to view the virtual image of the left eye image on the multiple left viewable areas VaL and allows the right eye 31R of the user 30 to view the virtual image of the right eye image on the multiple right viewable areas VaR. As described above, the right eye image and the left eye image are parallax images having parallax between them. The user 30 can thus view the right eye image and the left eye image as a 3D image.

A change in the positions of the eyes 31 of the user 30 changes the parts of the subpixels P1 to P12 used to display the virtual image viewable with the left eye 31l and the right eye 31r of the user 30. The controller 5 obtains positional information about the left eye 31l and the right eye 31r of the user 30 detected by the detector 3 through the obtainer 7A. The controller 5 controls, based on the position of the left eye 31*l* of the user 30, the parallax optical element 13 to cause the subpixels P1 to P6 displaying the left eye image to be viewed with the left eye 31*l*. The controller 5 controls, based on the position of the right eye 31*r* of the user 30, the parallax optical element 13 to cause the subpixels P7 to P12 displaying the right eye image to be viewed with the right eye 31*r*.

Figure 11:
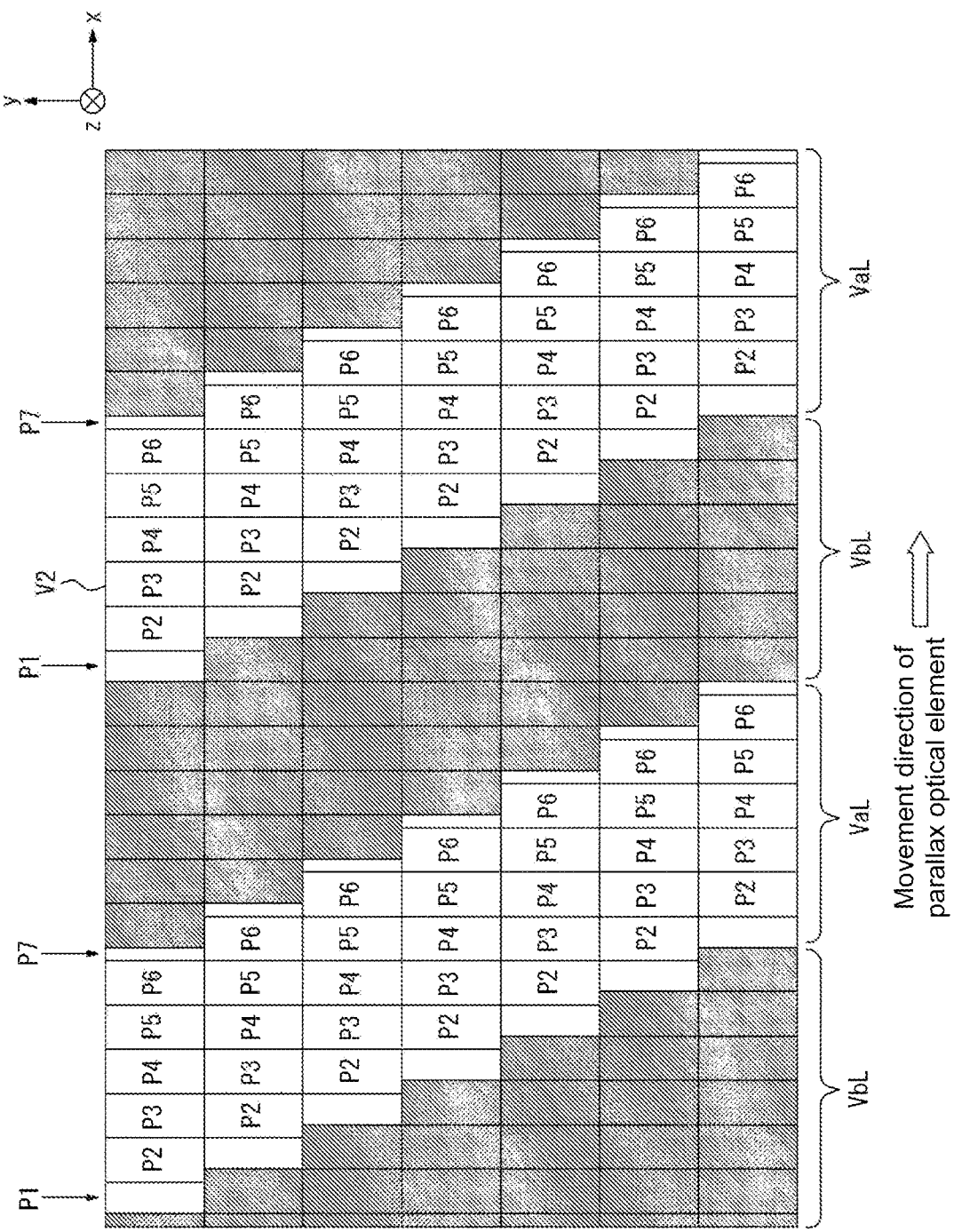
FIG. 11 is a diagram describing switching of the parallax optical element in response to a change in the positions of the user's eyes.

For example, the left eye 31*l* and the right eye 31*r* of the user 30 observing the second virtual image V2 as shown in FIGS. 9 and 10 may move relatively to the left. This causes the third virtual image V3 that is a virtual image of the parallax optical element 13 to appear to move to the right. FIG. 11 shows the second virtual image V2 viewable to the user 30 when the left eye 31*l* of the user 30 has moved to the left in the state shown in FIG. 7. As the left eye 31*l* of the user 30 moves to the left, the left viewable areas VaL and the left light-reducing areas VbL move to the right.

In the example shown in FIG. 11, each left viewable area VaL includes the entire part of each of the subpixels P2 to P6 and a part of each of the subpixels P1 and P7. Each right viewable area VaR includes the entire part of each of the subpixels P8 to P12 and a part of each of the subpixels P7 and P1. The controller 5 controls the parallax optical element 13 to cause each left viewable area VaL to include the largest part of each of the subpixels P1 to P6 displaying the left eye image. For example, in response to the left eye 31*l* of the user 30 moving further to the left in the state shown in FIG. 11, causing each left viewable area VaL to include a larger part of each subpixel P7 than the part of each subpixel P1 included, the controller 5 may switch open pixels P in the parallax optical element 13. In this case, the controller 5 switches, to open pixels, pixels with a lower light transmittance in the parallax optical element 13 for which virtual images are located adjacent to the left of the left viewable areas VaL. The controller 5 switches, to pixels with a lower light transmittance, open pixels in the parallax optical element 13 for which virtual images are located adjacent to the left of the left light-reducing areas VbL. The controller 5 switches open pixels P to maintain the subpixels P1 to P6 displaying the left eye image to be most easily viewable with the left eye 31*l* of the user 30. The controller 5 controls the parallax optical element 13 for the right eye 31*r* in the same manner.

In some embodiments, the parallax optical element 13 may have an aperture ratio of less than 50%. When, for example, one subpixel group Pg in the second area 52 includes 12 subpixels P1 to P12 as in FIG. 6, the controller 5 may control one subpixel group Pg to constantly include five subpixels with a higher light transmittance. In the state in FIG. 11, the controller 5 may control the parallax optical element 13 to add another pixel P with a lower light transmittance to the left of each left light-reducing area VbL to reduce image light from the subpixel P7.

In one of multiple embodiments, the HUD 2A may be switchable, for the user 30, between a first state for displaying a third image as a 3D image and a second state for displaying the third image as a 2D image in the manner described above. In the first state, the controller 5 displays a parallax image on the display panel 6A and displays, on the parallax optical element 13, the transmissive portions 13*a* and the light-reducing portions 13*b* for defining the traveling direction of image light. In the second state, the controller 5 displays a 2D image representing a 2D image on the display panel 6A and causes the parallax optical element 13 to be entirely in a light transmission state to transmit image light uniformly. The controller 5 performs control to synchronize the switching of the states of the display panel 6A and the parallax optical element 13. This allows the HUD 2A to select either a 2D image or a 3D image as appropriate and display the image as the third image for the user 30.

Figure 12:
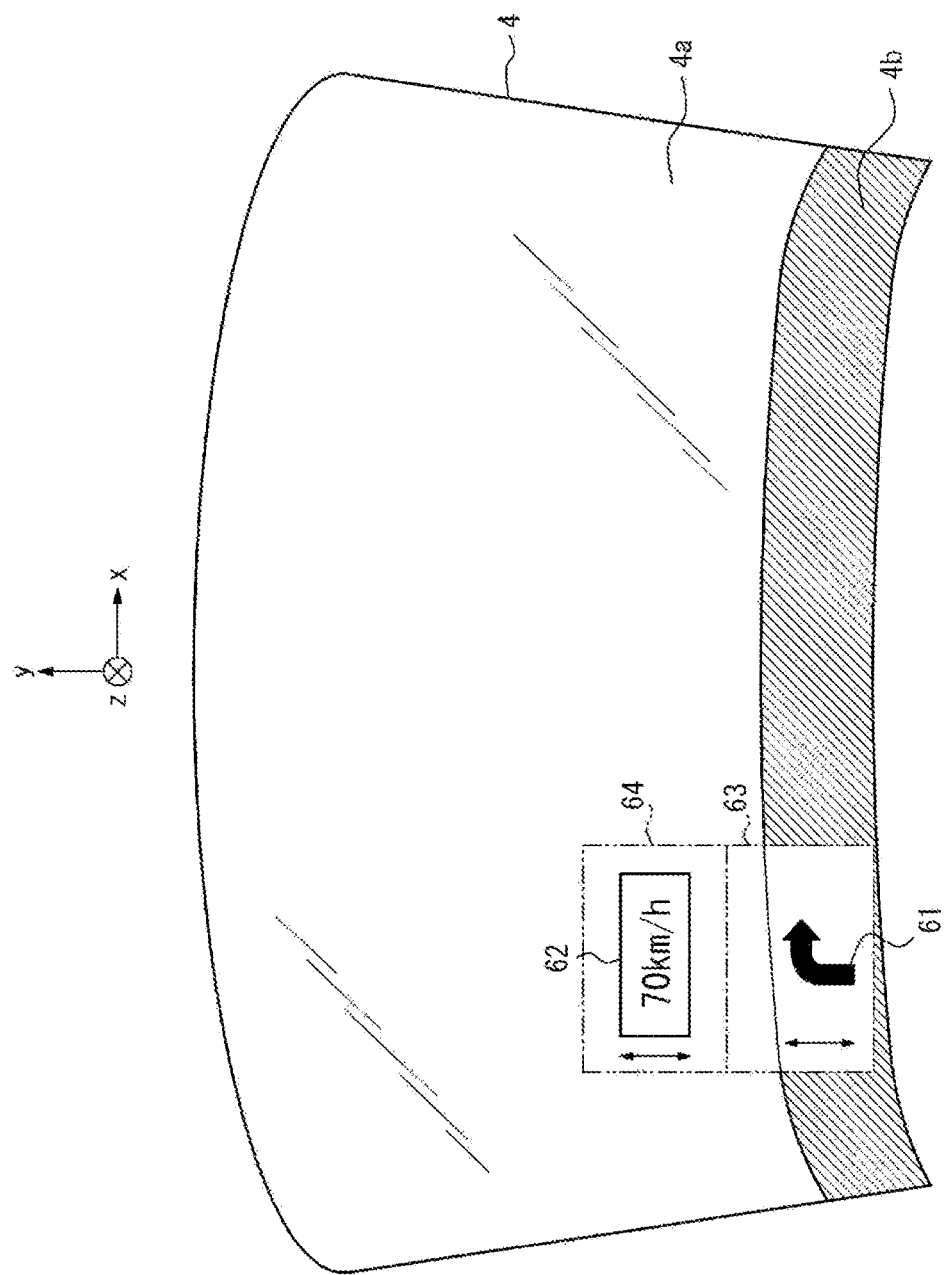
FIG. 12 is a diagram of an example display performed by the HUD system in FIG. 4.

The HUD system 1A with the above structure can display a second image 61 and a third image 62 on the reflective optical element 4A as viewed from the user 30, as shown in FIG. 12. The second image 61 appears as a 2D image in a first display area 63 corresponding to the first area 51 on the display panel 6A. The third image 62 appears as a 3D image in a second display area 64 corresponding to the second area 52 on the display panel 6A. The third image 62 is also switchable between a 2D image and a 3D image.

The controller 5 may thus change the positions at which the second image 61 and the third image 62 are displayed in accordance with positional information about the left eye 31*l* and the right eye 31*r* of the user 30 obtained from the obtainer 7A. The controller 5 may change the position at which either the second image 61 or the third image 62 is displayed alone in accordance with positional information about the left eye 31*l* and the right eye 31*r* of the user 30. For example, the controller 5 may change the position of the second image 61 on the display panel 6A and may not change the position of the third image 62 on the display panel 6A in accordance with positional information about the left eye 31*l* and the right eye 31*r* of the user 30. When the left eye 31*l* and the right eye 31*r* of the user 30 are at lower positions, the position of the second image 61 at a lower position as viewed from the user 30 alone can be changed to a position to be viewable to the user.

The controller 5 may change the positions at which the second image 61 and the third image 62 are displayed in accordance with the speed of the movable body 20 received from the input unit 8A. The controller 5 may change the position at which either the second image 61 or the third image 62 is displayed alone in accordance with the speed of the movable body 20. For example, the controller 5 may change the position of the second image 61 on the display panel 6A and may not change the position of the third image 62 on the display panel 6A in accordance with the speed. When the speed of the movable body 20 is higher, the position of the second image 61 at a lower position as viewed from the user 30 alone can be changed to a higher position to match the gaze direction of the user.

Although the above embodiments are described as typical examples, various modifications and substitutions to the embodiments are apparent to those skilled in the art without departing from the spirit and scope of the present disclosure. Thus, the above embodiments should not be construed to be restrictive, but may be variously modified or altered within the scope of the present disclosure. For example, multiple structural blocks described in the above embodiments or examples may be combined into a structural block, or each structural block may be divided. The embodiments of the present disclosure can also be implemented as a method or a program implementable by a processor included in the device, or as a storage medium storing the program. These method, program, and storage medium also fall within the scope of the present disclosure.

In one or more embodiments of the present disclosure, the parallax optical element is a liquid crystal shutter. The parallax optical element is not limited to a liquid crystal shutter but may be another optical element that can substantially define the viewing zone for the parallax image. For example, the parallax optical element may be a parallax barrier plate with slits that are arranged parallel to one another. The slits allow transmission of the right eye image in the parallax image along the optical path toward the right eye and the left eye image toward the left eye. For the parallax optical element being the parallax barrier with fixed openings as described above, the controller may switch, based on the movement of the head of the user, between subpixels displaying the left eye image and subpixels displaying the right eye image on the second display panel. In this manner, the controller can continue displaying a 3D image for the user independently of any displacements of the eyes of the user.

The parallax optical element may be an optical component including multiple lenticular lenses arranged parallel to one another in a flat surface. The lenticular lenses can deflect the left eye image and the right eye image in the parallax image alternately displayed on the second display panel respectively to the optical path toward the right eye and the optical path toward the left eye.

The present disclosure may be implemented in the following forms.

A head-up display according to one embodiment of the present disclosure includes a display panel, a reflective optical element, a controller, and an obtainer. The display panel displays a first image. The reflective optical element reflects image light from the first image displayed by the display panel. The controller controls a position at which the first image is displayed on the display panel. The obtainer obtains, as positional information, a position of an eye of a user. The controller changes the position at which the first image is displayed on the display panel in accordance with the positional information.

A head-up display system according to one embodiment of the present disclosure includes a head-up display and a detector. The detector detects, as positional information, a position of an eye of a user. The head-up display includes a display panel, a reflective optical element, a controller, and an obtainer. The display panel displays a first image. The reflective optical element reflects image light from the first image displayed by the display panel. The controller controls a position at which the first image is displayed on the display panel. The obtainer obtains the positional information from the detector. The controller changes the position at which the first image is displayed on the display panel in accordance with the positional information.

A movable body according to one embodiment of the present disclosure includes a head-up display system. The head-up display system includes a head-up display and a detector. The detector detects, as positional information, a position of an eye of a user. The head-up display includes a display panel, a reflective optical element, a controller, and an obtainer. The display panel displays a first image. The reflective optical element reflects image light from the first image displayed by the display panel. The controller controls a position at which the first image is displayed on the display panel. The obtainer obtains the positional information from the detector. The controller changes the position at which the first image is displayed on the display panel in accordance with the positional information.

The structure according to the embodiments of the present disclosure can provide an image easily viewable to the user as appropriate at the user's eye positions.

Although embodiments of the present disclosure have been described in detail, the present disclosure is not limited to the embodiments described above, and may be changed or modified in various manners without departing from the spirit and scope of the present disclosure. The components described in the above embodiments may be entirely or partially combined as appropriate unless any contradiction arises.

REFERENCE SIGNS LIST 1, 1A head-up display system (HUD system)
2, 2A HUD
3 detector
4, 4A reflective optical element
4a first reflective area
4b second reflective area
5 controller
6 display panel
7, 7A obtainer
8, 8A input unit
9 electronic control unit (ECU)
11 first image
12 image display area
13 parallax optical element
13a transmissive portion
13b light-reducing portion
14 optical system
20 movable body
30 user
31L left eye
31R right eye
32 viewing zone
51 first area
52 second area
61 second image
62 third image
63 first display area
74 second display area
A active area
P pixel
Pg subpixel group
V1 first virtual image
V2 second virtual image
V3 third virtual image
VaL left viewable area
VbL left light-reducing area
VaR right viewable area
VbR right light-reducing area

The invention claimed is:
1. A head-up display, comprising:
a display panel having an active area including a plurality of subpixels, the display panel configured to display a first image;
a reflective optical element having an image display area, the reflective optical element configured to receive image light corresponding to the first image directly from the display panel and reflect image light in the image display area corresponding to at least a portion of the received image light corresponding to the first image projected from the display panel;
a controller configured to control a position at which the first image is displayed on the display panel; and
an obtainer configured to obtain, as positional information, a position of an eye of a user,
wherein the controller changes the position at which the first image is displayed on the display panel from a first position to a second position in accordance with the positional information to change the position of the first image projected on the image display area of the reflective optical element.

2. The head-up display according to claim 1, wherein the controller causes the position at which the first image is displayed on the display panel to be in a range in which the first image is viewable to the user in accordance with the positional information.

3. The head-up display according to claim 1, wherein
the head-up display is mountable on a movable body, and further comprises an input unit configured to receive an input of a speed of the movable body, and
the controller changes the position at which the first image is displayed on the display panel in accordance with the speed.

4. The head-up display according to claim 3, wherein the controller changes the position at which the first image is displayed on the display panel to cause the first image to be viewed at a higher position in a field of view of the user as the speed is higher.

5. The head-up display according to claim 3, wherein the controller changes the position at which the first image is displayed on the display panel to cause the first image to be viewed at a lower position in a field of view of the user as the speed is lower.

6. The head-up display according to claim 3, wherein
the first image includes a second image and a third image,
the controller changes a position at which the second image is displayed on the display panel in accordance with the speed, and
the controller does not change a position at which the third image is displayed on the display panel in accordance with the speed.

7. The head-up display according to claim 6, wherein the controller changes the position at which the second image is displayed on the display panel in accordance with the positional information.

8. The head-up display according to claim 1, wherein the reflective optical element includes a first reflective area to reflect a part of image light being incident and to transmit another part of the image light.

9. The head-up display according to claim 8, wherein the controller performs control to cause projection of light for at least a part of the first image onto the first reflective area.

10. The head-up display according to claim 1, wherein the reflective optical element includes a second reflective area to reflect a part of image light being incident and to substantially block another part of the image light.

11. The head-up display according to claim 10, wherein the controller performs control to cause projection of light for at least a part of the first image onto the second reflective area.

12. A head-up display system, comprising:
a head-up display; and
a detector configured to detect, as positional information, a position of an eye of a user,
wherein the head-up display includes
a display panel having an active area including a plurality of subpixels, the display panel configured to display a first image,
a reflective optical element having an image display area, the reflective optical element configured to receive image light corresponding to the first image directly from the display panel and reflect image light in the image display area corresponding to at least a portion of the received image light corresponding to the first image projected from the display panel,
a controller configured to control a position at which the first image is displayed on the display panel, and
an obtainer configured to obtain the positional information from the detector, and
the controller changes the position at which the first image is displayed on the display panel from a first position to a second position in accordance with the positional information to change the position of the first image projected on the image display area of the reflective optical element.

13. A movable body, comprising:
a head-up display system including
a head-up display, and
a detector configured to detect, as positional information, a position of an eye of a user,
wherein the head-up display includes
a display panel having an active area including a plurality of subpixels, the display panel configured to display a first image,
a reflective optical element having an image display area, the reflective optical element configured to receive image light corresponding to the first image directly from the display panel and reflect image light in the image display area corresponding to at least a portion of the received image light corresponding to the first image projected from the display panel,
a controller configured to control a position at which the first image is displayed on the display panel, and
an obtainer configured to obtain the positional information from the detector, and
the controller changes the position at which the first image is displayed on the display panel from a first position to a second position in accordance with the positional information to change the position of the first image projected on the image display area of the reflective optical element.

\* \* \* \* \*